United States Patent
Yang et al.

(10) Patent No.: US 8,180,377 B2
(45) Date of Patent: May 15, 2012

(54) METHOD FOR CAPTURING REAL-TIME VIDEO AND AUDIO DATA AT SPECIFIC LOCATION

(76) Inventors: Jin-Jie Yang, Tainan (TW); Shoue-Ann Yang, Tainan (TW); Hsin-Yuan Yang Chen, Tainan (TW)

( * ) Notice: Subject to any disclaimer, the term of this patent is extended or adjusted under 35 U.S.C. 154(b) by 333 days.

(21) Appl. No.: 12/458,402

(22) Filed: Jul. 10, 2009

(65) Prior Publication Data

US 2010/0009698 A1    Jan. 14, 2010

(30) Foreign Application Priority Data

Jul. 11, 2008  (TW) .............................. 97126564 A

(51) Int. Cl.
  *H04W 88/02*  (2009.01)
(52) U.S. Cl. ................. 455/456.3; 455/404.2

(58) Field of Classification Search ............... 455/456.3, 455/404.2; 381/104; 726/3; 345/418, 427; 701/119, 200, 202, 214; 715/764
See application file for complete search history.

(56) References Cited

U.S. PATENT DOCUMENTS

| | | | |
|---|---|---|---|
| 2003/0014286 A1* | 1/2003 | Cappellini | 705/5 |
| 2006/0241860 A1* | 10/2006 | Kimchi et al. | 701/208 |
| 2009/0132316 A1* | 5/2009 | Florance et al. | 705/7 |

* cited by examiner

*Primary Examiner* — Diane Mizrahi
(74) *Attorney, Agent, or Firm* — Rosenberg, Klein & Lee

(57) ABSTRACT

A method for capturing real-time video and audio data at a specific location is provided. A real-time video and audio data of people, objects and landscapes at a specific location may be obtained at any time and place. A user needing real-time video and audio data of objects, people and landscapes at a specific location access a specific website and then inputs his/her requests. By the website, these requests are transmitted to a mainframe platform of the telecommunication companies which have signed an agreement with a company of the website and telecommunication companies select and match video mobile phone users for providing the services to users.

2 Claims, 5 Drawing Sheets

METHOD FOR CAPTURING REAL-TIME VIDEO AND AUDIO DATA AT SPECIFIC LOCATION

BACKGROUND OF THE INVENTION

1. Fields of the Invention

The present invention relates to a method for capturing real-time video and audio data at a specific location in which real-time video and audio data at any place all over the world by cooperation between internet users and mobile phone users, and various devices such as websites, telecommunication companies, base stations, global positioning systems, base station databases of global telecommunication companies and video mobile phones.

2. Descriptions of Related Art

Within image services of network geographic information system and photo-shooting services of mobile phones, the followings are available: 1. travel around the world through webcams. 2. mobile phone is used as a camera in a Satellite News Gathering (SNG) system. 3. 3G mobile phone with video conferencing features. 4. MSN groups service. 5 google earth. 6. 3G Camera. 7. Web-based remote monitoring and control system used by security companies 8. Remote multi-robot monitoring and control system based on web services used by security companies.

Thus if people want to obtain real-time images from a specific location, the above eight devices can be used. However, each device has its own shortcomings that is described in the following details:

1. While using the mobile phone in the Satellite News Gathering (SNG) system and the 3G mobile phone in video conferencing, the user got to know the person and his/her phone number so as to seek assistance from him/her. But where the person is may not be just the place the user required to view.
2. While contacting by MSN, the user also needs to get the person's network address, or both are joined into a common platform for contacting each other, but they do not know each other. Still, the person may be not around the place the user intends to view.
3. As to google earth, the database is too large and too slow of a data update so that it is difficult to get real-time images. Furthermore, the satellite is far away from the earth's surface so that the resolution of the lens is insufficient, the image is unclear and static. It is impossible to get real-time audio comments and an interactive function.
4. To get the real-time image by 3G camera is similar to that by webcam. Thus webcams must be prevalent and available on thousands of sites and this costs a lot.
5. Security companies use web-based remote monitoring and control system to get real-time images. In practice, only some people related to the place being monitored are allowed to view these real-time images. And similar to webcams, only the place arranged with the monitoring and control system can be seen and there is no interaction.
6. Security companies use web-based remote multi-robot monitoring and control system to get real-time images. In practice, only some people related to the place being monitored are allowed to view these real-time images shot by robots. Moreover, although the robot can move to the place the user intends to view, there is a distance restriction on the robot.

SUMMARY OF THE INVENTION

Therefore it is a primary object of the present invention to provide a method for capturing real-time video and audio data of at a specific location in which a system user can enter a specific website and input his/her needs of real-time video and audio data of people, thing and landscapes at a specific location. By the website, these needs are transmitted to a mainframe platform of the telecommunication companies that have signed a contract with a company of the website and the telecommunication companies select and match video mobile phone users that can provide services for above needs. The method features on that: by cooperation between the websites and the telecommunication companies, the user can ask a video mobile phone user at a specific location to provide real-time video and audio services at that location anytime and anywhere he wants. For the system user, the video mobile phone user is a stranger. When the video mobile phone user receives the above request, the video mobile phone user is willing to provide images with audio comments to the system user due to specific interests and communal cooperation. Thereby the places with such services of real-time images are the places where the video mobile phone users are. The improvement of this method lies in when the system user needs real-time video and audio services at a specific location, there are over one hundred million video mobile phones available to provide such services, the service provider is not restricted to friends, relatives or webcams. This method increases the selectivity of the location and the places are not limited to the locations with webcams, friends or relatives of the system user.

The specific website of the present invention is a website that people can register on the website to become a member, input requests and obtain real-time video and audio data of people, thing and landscapes at a specific locations. The website provides format buttons for system users to input their requests, films that have been shot and transmitted while after data such as geographic name, date, etc. of the films being edited, the films are provided to be clicked by people accessing the specific website and become shared resources of the specific website. The specific website also provides advertising services. The website includes following options to be selected and input requests by users. 1. a specific location and content users want to know 2. whether audio comments are needed or not 3. what kind of language is used in audio comments 4. whether interactive instant message (exchange) is needed 5. the time users intend to check.

It is another object of the present invention to provide a method for capturing real-time video and audio data at a specific location in which after the specific location that the user wants to view being input, the specific website provides electronic maps, satellite images and satellite maps of the specific location for users' reference. Moreover, latitude and longitude of the specific location is shown by a geographic information system.

It is a further object of the present invention to provide a method for capturing real-time video and audio data at a specific location in which within the above website, geographical distribution of base stations is provided by the telecommunication companies so as to form a global video mobile phone base station database of telecommunication companies. After receiving requests from users, the received data is matched in the database within the website so as to select which telecommunication company the requests are transmitted to.

After being received by the website or a medium, the requests are sent to a mainframe platform of a telecommunication company. Which telecommunication company is suitable to provide the services for the requests is selected by users or according to internal software of the website. The selected telecommunication company must have base stations just at or around the locations that the users want to check so as to transmit data. Moreover, the telecommunication companies have to sign contracts with the website companies and agree the input requests from the website entering into a mainframe platform of the telecommunication company so as to select and match mobile phone users available to provide the services.

After receiving the above requests, there are two operation modes of the telecommunication company to select and match mobile phone users available to provide the services.

(1) When the user asks for real-time video and audio data and inputs a country name and address within the website, latitude and longitude of the location is shown by a geographic information system of satellite navigation software. The latitude and longitude corresponds to the global video mobile phone base station database of telecommunication companies to find out base stations of all telecommunication companies near the latitude and longitude and check which telecommunication company is suitable to deal with the real-time video and audio data in this area. Then the requests input by the users are sent to a mainframe platform of the telecommunication company. After receiving the requests, the telecommunication company starts searching and checking signal strength of all video mobile phones from the base stations within a certain range around the requested location and correspondingly finds out geographic location information of the base stations. Next by calculation of a location software for the base station, latitude and longitude of the video mobile phones are obtained and compared with the latitude and longitude of the required location input by the user so as to find out the video mobile phones available and most close to the requested location.

(2) When the user asks for real-time video and audio data and inputs a country name and address within the website, latitude and longitude of the location is shown by a geographic information system of satellite navigation software. The latitude and longitude corresponds to the global video mobile phone base station database of telecommunication companies to find out base stations of all telecommunication companies near the latitude and longitude and check which telecommunication company is suitable to deal with the real-time video and audio data in this area. Then the requests input by the users are sent to a mainframe platform of the telecommunication company. After receiving the requests, the telecommunication company finds out latitude and longitude of the video mobile phones having GPS (global positioning system) function and provided with services by the telecommunication company itself within a certain range around the requested location. Then compare the latitude and longitude of the video mobile phones with that of the requested location input by the user so as to find out the video mobile phones most close to the requested location.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1 a schematic drawing showing system structure of an embodiment according to the present invention.

DETAILED DESCRIPTION OF THE PREFERRED EMBODIMENT

Figure 1:
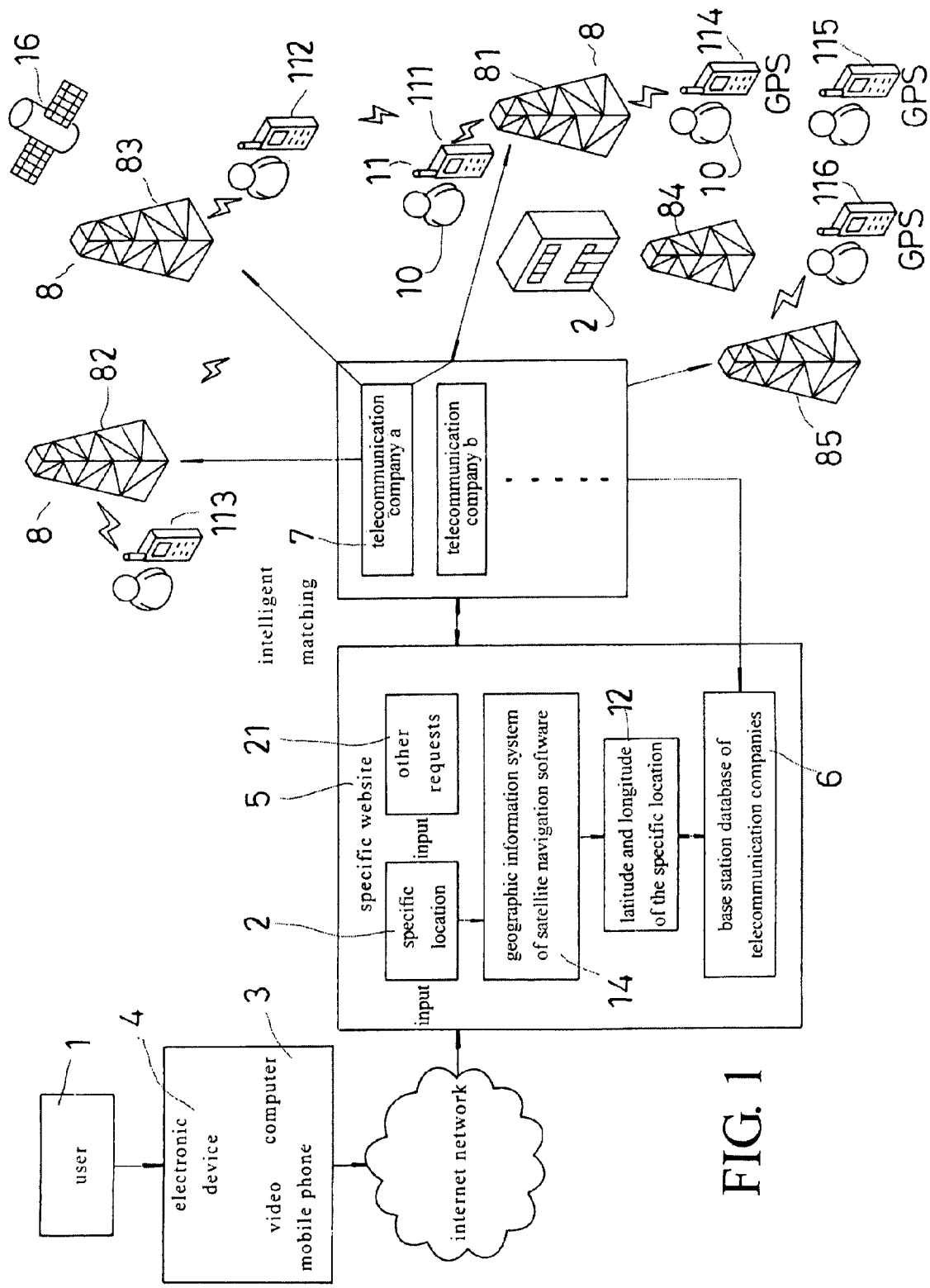
Figure 2:
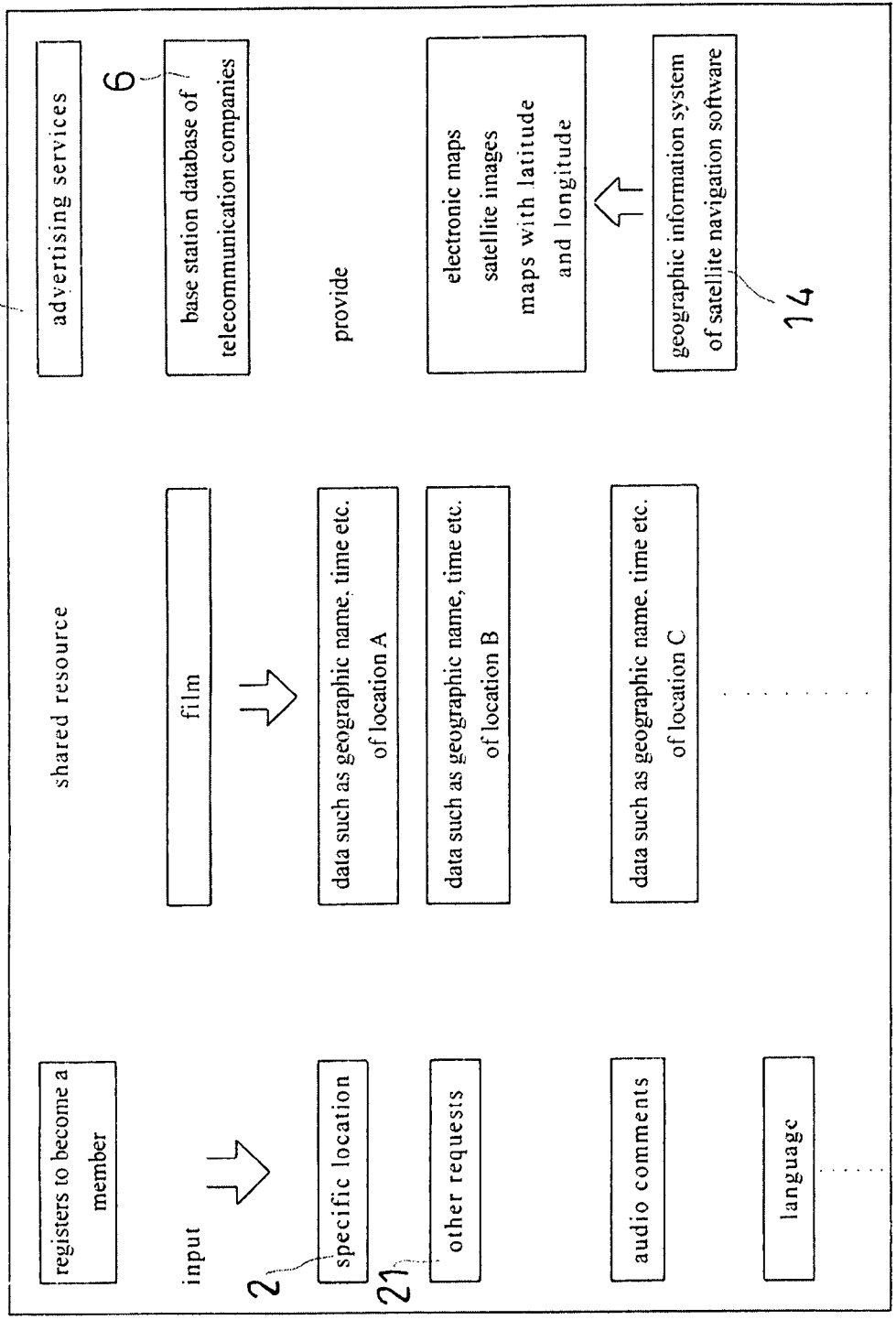
FIG. 2 is a function structure of a specific website of an embodiment according to the present invention.
Figure 3:
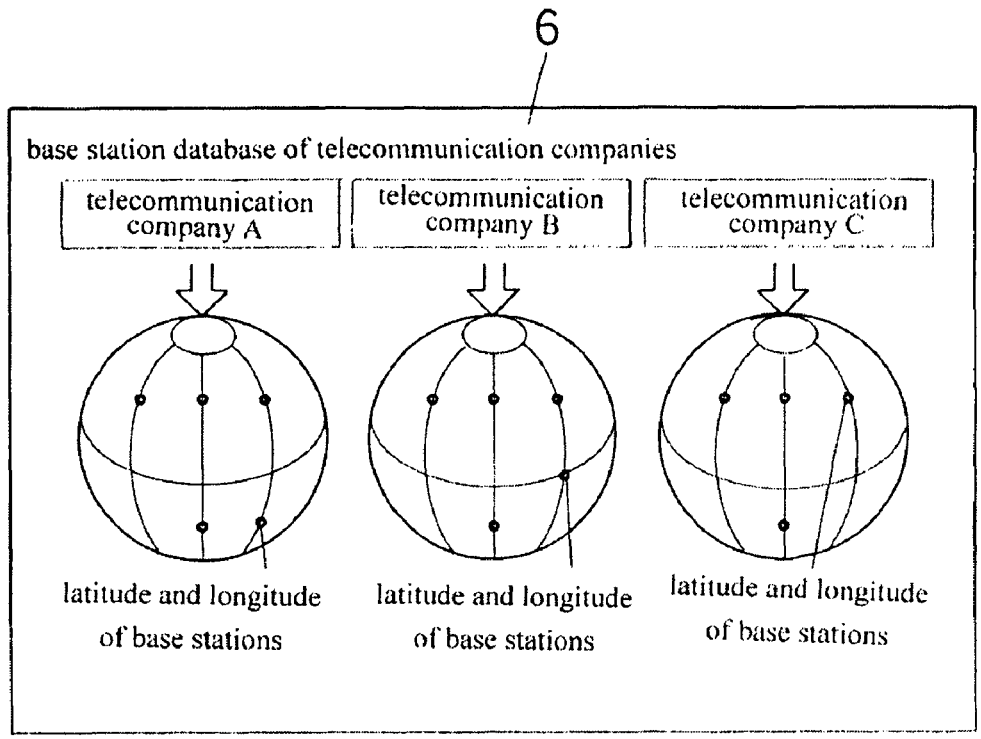
FIG. 3 shows a system and function of global video mobile phone base station database of telecommunication companies.
Figure 4:
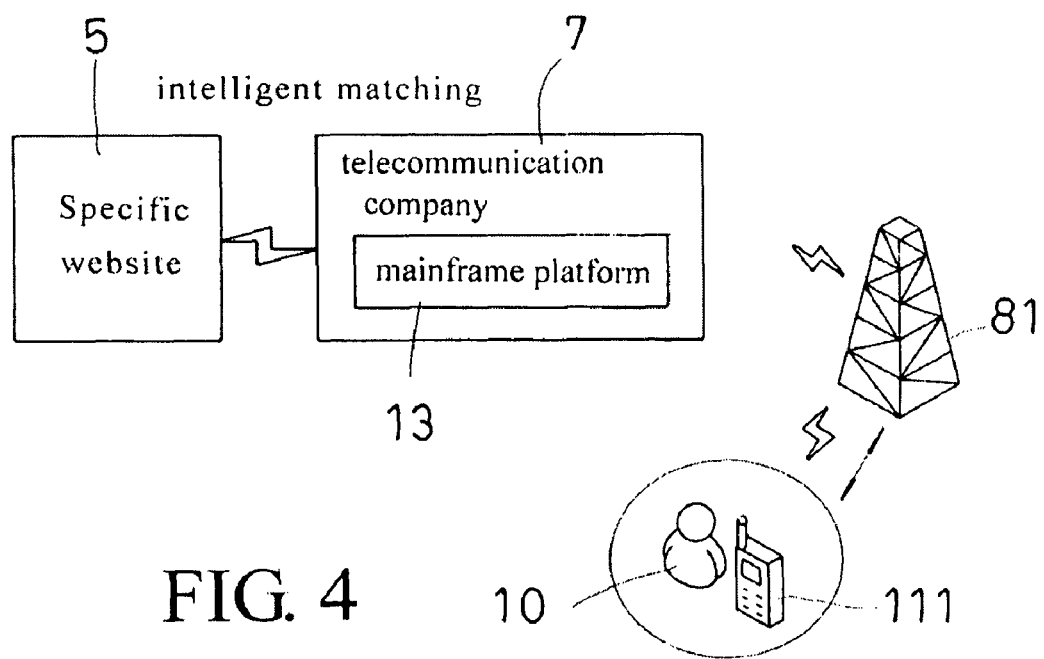
FIG. 4 is a systematic flow chart showing how telecommunication companies select and match video mobile phones available to provide services.
Figure 5:
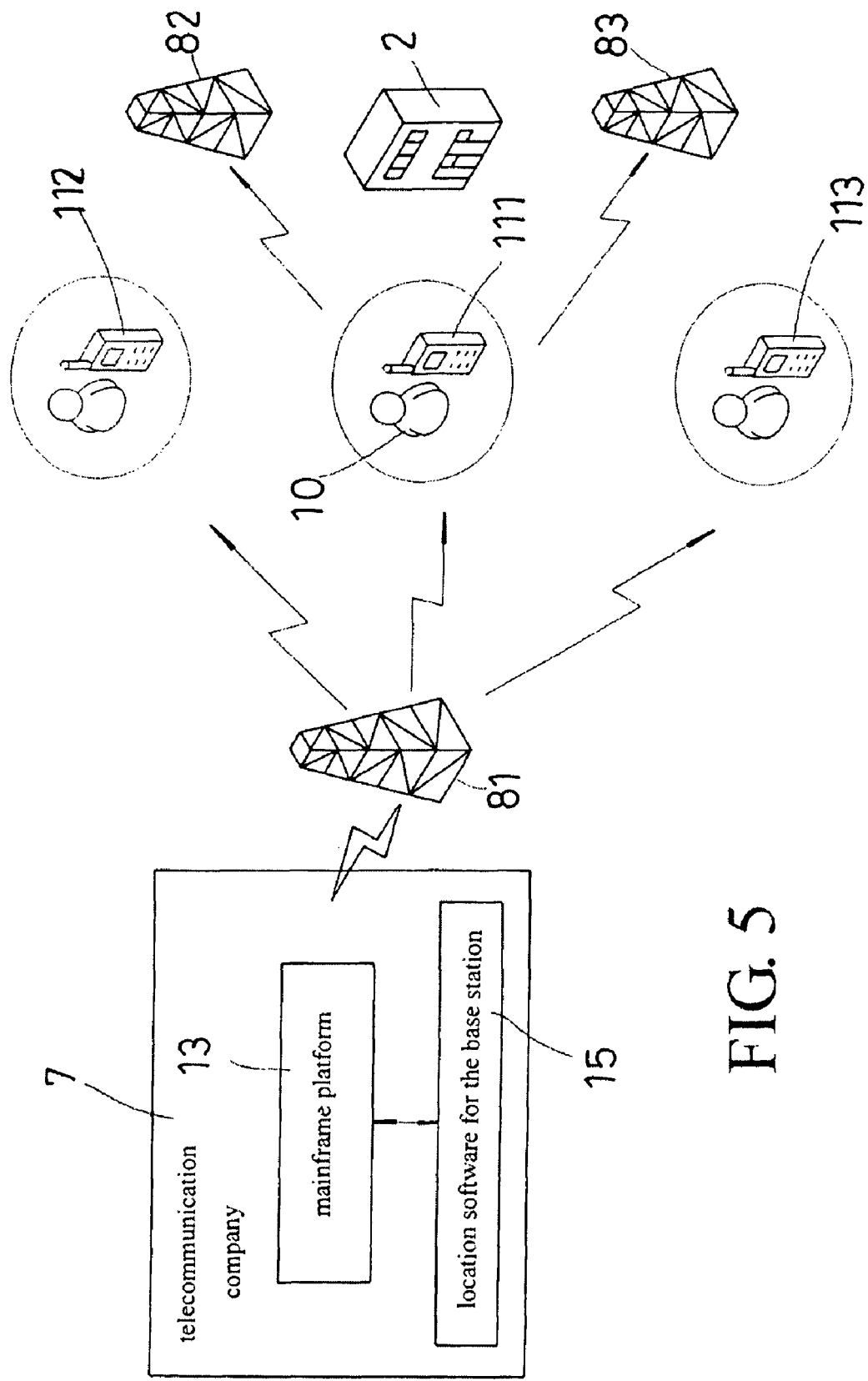
FIG. 5 is a systematic flow chart showing selection and matching of video mobile phones available to provide services by base station locating.
Figure 6:
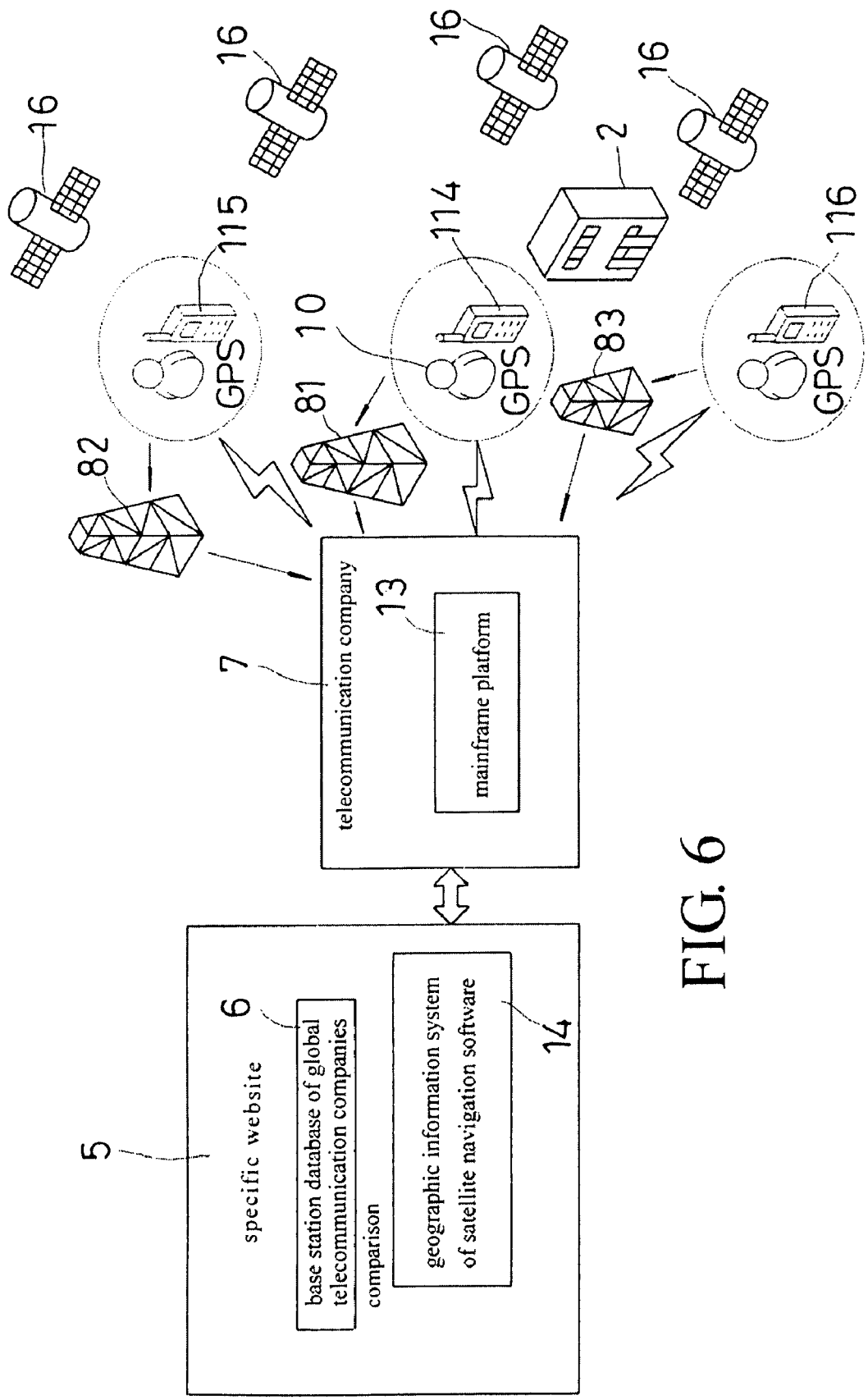
FIG. 6 is a systematic flow chart showing selection and matching of video mobile phones available to provide services by a global positioning system.

Referring to FIG. 1 and FIG. 2, a user (1) that needs real-time video and audio data at a specific location enters a specific website (5) and registers to become a member of that website (5) by a computer (3) or a portable electronic device (4) with internet access. Then according to format buttons within the website (5), input his/her requirements such as a specific location (2) he intends to investigate, the content he intends to know, whether audio comments are needed or not, what kind of language is used in audio comments, whether interactive instant message (exchange) is needed, the time he intends to check and other requests (21). By a Geographic Information System (14) of satellite navigation software of this website, latitude and longitude (12) of the specific location (2) is shown. The latitude and longitude (12) corresponds to the global video mobile phone base station database (6) of telecommunication companies for being matched in the database and finding out all base stations (8) near the latitude and longitude (12). Then the base stations (81), (82), (83) suitable to transmit the data related to the specific location (2) and other requests (21) and belonging to the same telecommunication company (7) are selected. The demands input by the user (1) such as the specific location (2), the content he intends to know, whether audio comments are needed or not, what kind of language is used in audio comments, whether interactive instant message (exchange) is needed, the time he intends to check and other requests (21) are sent to a mainframe platform (13) of the telecommunication company (7) that offers network of the base stations (81), (82), (83) suitable to transmit the data related to the specific location (2) and other requests (21) around the latitude and longitude (12). After receiving the information of the specific location (2) and other requests (21), the telecommunication company (7) starts searching and checking signal strength of all video mobile phones (11) from the base stations (81), (82), (83) around the specific location (2) by the base stations (81), (82), (83) and correspondingly finds out geographic location information of the base stations (81), (82), (83). By calculation of a location software for the base station (15), all video mobile phones (111), (112), (113), (114), (115), (116) that are available to provide real-time video and audio services within a certain range near the latitude and longitude (12), are found out.

After the telecommunication company (7) getting all of the video mobile phones (111), (112), (113), (114), (115), (116) that are available to provide real-time video and audio services within a certain range around the specific location (2), it informs users of the mobile phones according to the different distances between the specific location (2) and the mobile phone. If the first mobile phone user is unable to answer or unable to provide the service, the system notifies other users in turn until a video mobile phone user (10) that answers the call and provides real-time video and audio services by the video mobile phone (111) willingly. Once the video mobile phones (111), (112), (113), (114), (115), (116) within a range of the specific location (2) are all unable to answer, the user (1) is notified that no service is available. Another way is to notify all users of the video mobile phones (111), (112), (113), (114), (115), (116) that match the requirements within a range of the specific location (2) simultaneously. The video mobile phone (111) matched by the telecommunication company (7) is the first to answer. Once all the video mobile phones (111), (112), (113), (114), (115), (116) within the range of the location are all unable to answer, the system user (1) is notified that no service is available.

Another embodiment is as following.

A user (1) that requires real-time video and audio data at a specific location enters a specific website (5) and registers to become a member of that website (5) by a computer (3) or a portable electronic device (4) with internet access. Then according to format buttons within the website (5), input his/her requirements such as a specific location (2) he intends to check, the content he intends to know, whether audio comments are needed or not, what kind of language is used in audio comments, whether interactive instant message (exchange) is needed, the time he intends to check and other requests (21). By a geographic information system (14) of satellite navigation software of this website, latitude and longitude (12) of the specific location (2) is shown. The latitude and longitude (12) corresponds to the global video mobile phone base station database (6) of telecommunication companies for being matched in the database and finding out all base stations (8) near the latitude and longitude (12). Then the data related to the specific location (2) and other requests (21) around the latitude and longitude (12) is sent to a mainframe platform of the telecommunication company (7) that offers network of the suitable base stations (81), (82), (83).

After receiving the information of the specific location (2) and other requests (21), the telecommunication company (7) finds out all video mobile phones (114), (115), (116) in its network, having global positioning system and within a certain range near the latitude and longitude (12) by the base stations (81), (82), (83), locates and gets the latitude and longitude data of the video mobile phones (114), (115), (116). Some of other base stations (84), (85) belonging to different telecommunication company (7) are around the specific location (2) and are matched with the latitude and longitude (12) of the required location. Thus the video mobile phones (114), (115), (116) are arranged in sequence according to the different distances between each of them and the latitude and longitude (12) of the specific location (2). The mobile phone closest to the specific location (2) is called in a first priority, the next to be called farther than the first one and so forth. If the first mobile phone user is unable to answer or unable to provide the service, the system will notify other users in turn until a video mobile phone user (10) that answers the call and provides real-time video and audio services by the video mobile phone (114) willingly. Once the video mobile phones (114), (115), (116) within a range of the location are all unable to answer, the system user (1) is notified that no service is available.

After finishing finding the specific location (2) that the system user (1) requested, films (video and audio data) are transmitted to the specific website (5). After data, such as geographic name, date, etc., of the films being edited, the films are provided to be clicked by people accessing the specific website (5) and become shared resources of the specific website (5). The specific website (5) also provides advertising services for various companies.

In the embodiments, how the telecommunication companies find out all the video mobile phones available for providing real-time video and audio near the specific location is a key point of the method of the present invention and is described in details in the followings:

(A) base station positioning: also called GSM (Global System for Mobile communications) positioning. It utilizes a base station with latitude and longitude together with signal strength received by mobile phones from base stations to get the distance between the mobile phones and the base stations. Then by this data and geometric relative positioning, latitude and longitude information of the mobile phones can be calculated.

(B) In a Global Positioning System (GPS), the distance from a receiver to each satellite is computed. With the formula of distance in 3D coordinates and three satellites setting up three equations, the location of the observation point (receiver) can be calculated. Ideally, a GPS receiver would only need to lock on to three satellites to pinpoint a geographic position, but the more satellites a GPS receiver is locked on to the more precise position it will report. Each GPS receiver can be locked on to at least four satellite locks simultaneously to calculate a better position horizontally and vertically, and reduce error margin between the satellite's clock and the receiver's clock. Still, every four satellites form a set, so a plurality of satellite sets is made and the one with minimum error is chosen.

(C) The technique of assisted GPS uses a cellular network to download and transmit the remotely collected satellite navigation data from the base station to the mobile phone. The AGPS speeds up the location calculation remarkably.

(D) Differential Global Positioning System, abbreviated as DGPS, is an enhancement to GPS that uses a network of known reference stations around a specific location to correct the error of GPS. The real-time error is introduced into the coordinate transformation so as to get more precise coordinate data.

In an embodiment of the present invention, the base stations available now are used as ground reference stations of the DGPS. The installation, data connection, data analysis, precise coordinates of these ground reference stations and essential works such as united computing, transmit, broadcast of data of positioning error etc. at each moment are finished by the construction units or operation units of the base station itself. As to the latitude and longitude coordinates of GPS chips of the video mobile phones, it is retrieved by the base station so as to compare with the latitude and longitude of the specific location the user intends to know for finding out all video mobile phones closest to the specific location.

The user needs to pay for the use of the information he/she requested. Once there is at least one video mobile phone that can provide above services, the user can immediately get the information he/she required. The owner of the mobile phone that can provide real-time information service should be a client of the telecommunication company. The video mobile phone used must be able to provide real-time video and audio data. Whether the owner and the mobile phone are qualified is checked by the telecommunication company. The telecommunication company provides the clients with various programs related to the services. The telecommunication company also sets an agreement that provides rewards to the clients who offer the services. And the website companies give the clients the rewards for the services they provided according to a contract they signed with the telecommunication company.

The following is an example of an application method according to the present invention. Example 1: a person A is going to travel a few days later and wants to choose travel destinations from place 1, place 2 and place 3. He connects to the internet and inputs locations of the above three places 1, 2, and 3 respectively. The website companies and telecommunication companies will find the clients who can provide real-time image shooting only or with audio commends simultaneously. He gets the real-time images and data of these three places 1, 2, 3 to make a decision. Example 2: a person B suddenly wants to see whether it is snowing in Central Park, New York City. However, there is no friend or relative for him to ask and get answers. Once he enters the website of the present invention and inputs location data related to the Central Park, the website and the telecommunication company will find someone who can take a real-time image of the Central Park only or with audio commends simultaneously to meet his/her requests.

In summary, the method that captures real-time video and audio data at a specific location of the present invention has the following advantages:

1. A new application and service is added into digital mobile services of networks and video mobile phones. Thus people around world can read and obtain real-time video and audio data of various locations in the world anytime and anywhere.
2. All video mobile phones become providers of real-time video and audio data. Thus selectivity of real-time images at specific locations that people want to see is increased dramatically and people's desires are satisfied more easily. Therefore, real-time data at each specific location is obtained more conveniently. Otherwise people need to get that location exhaustingly and it doesn't have to be like that.
3. The method of the present invention is a cooperating and interactive way to obtain real-time video and audio data such as images at a specific location. There is no need to set up webcams or 3G cameras at the places the users want to see. By connecting network users and mobile phone users, people can get real-time video and audio data at a specific location anytime and anywhere they want in a cooperating, convenient and economical way.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method of real-time multimedia information acquisition and provision, said method comprising the steps of:
   a) using an intermediate server device, receiving an information provision request including target location information from a client user;
   b) using the intermediate server device, selecting one of a plurality of candidate server devices, each of which is associated with service area information, based on a result of matching between the target location information from the client user and the service area information of the candidate server devices, for each of the candidate server devices, the service area information indicates locations of base stations associated with the candidate server device, the service area information of the candidate server devices form a base station database, and the target location information from the client user is matched with the base station database to find the selected one of the candidate server devices, the location of at least one base station of the selected one of the candidate server devices corresponding to the target location information from the client device;
   c) using the intermediate server device, transmitting the information provision request from the client user to the selected one of the candidate server devices; and
   d) using the selected one of the candidate server devices, selecting from a database of candidate users of the selected one of the candidate server devices, one of the candidate users in the database based on a result of matching between latitude and longitude corresponding to the target location information from the client user and latitude and longitude corresponding to current location information of the candidate users, wherein the selected one of the candidate users is a user that has a video mobile phone with Global Positioning System (GPS) function and that is available to provide real-time multimedia information corresponding to the information provision request to the client user, the longitude and latitude corresponding to the current location information of the candidate users are found using the base stations associated with the selected one of the candidate server devices that are within a range of a location corresponding to the target location information from the client user.

2. The method as claimed in claim 1, step d) further comprising the base stations are being used as ground reference stations of differential Global Positioning System (GPS) to find the candidate users within the range of the location corresponding to the target location information from the client user.

* * * * *